(12) United States Patent
Doane et al.

(10) Patent No.: US 8,103,673 B2
(45) Date of Patent: Jan. 24, 2012

(54) SYSTEMS AND METHODS FOR PROVISIONING CONTENT FROM MULTIPLE SOURCES TO A COMPUTING DEVICE

(75) Inventors: David A. Doane, Draper, UT (US); Douglas Jock Walker, Springville, UT (US)

(73) Assignee: PresenceID, Inc., Salt Lake City, UT (US)

( * ) Notice: Subject to any disclaimer, the term of this patent is extended or adjusted under 35 U.S.C. 154(b) by 650 days.

(21) Appl. No.: 11/864,268

(22) Filed: Sep. 28, 2007

(65) Prior Publication Data

US 2008/0082539 A1    Apr. 3, 2008

Related U.S. Application Data

(60) Provisional application No. 60/827,841, filed on Oct. 2, 2006, provisional application No. 60/828,015, filed on Oct. 3, 2006.

(51) Int. Cl.
  *G06F 7/00* (2006.01)
  *G06F 17/30* (2006.01)
(52) U.S. Cl. ......... 707/741; 707/743; 707/778; 707/786
(58) Field of Classification Search ............. 707/741, 707/743, 778, 786
  See application file for complete search history.

(56) References Cited

U.S. PATENT DOCUMENTS

| | | | |
|---|---|---|---|
| 5,220,675 A * | 6/1993 | Padawer et al. ............... 715/826 |
| 5,499,358 A | 3/1996 | Nevarez | |
| 5,608,903 A | 3/1997 | Prasad et al. | |
| 5,742,820 A | 4/1998 | Perlman et al. | |
| 5,758,344 A | 5/1998 | Prasad et al. | |
| 5,794,232 A | 8/1998 | Mahlum et al. | |
| 5,818,936 A | 10/1998 | Mashayekhi | |
| 5,893,118 A | 4/1999 | Sonderegger | |
| 5,933,826 A | 8/1999 | Ferguson | |
| 6,105,062 A | 8/2000 | Andrews et al. | |
| 6,182,142 B1 * | 1/2001 | Win et al. ............. 709/229 |
| 6,192,405 B1 | 2/2001 | Bunnell | |
| 6,438,594 B1 | 8/2002 | Bowman-Amuah | |
| 6,442,748 B1 | 8/2002 | Bowman-Amuah | |
| 6,446,253 B1 | 9/2002 | Mellmer | |
| 6,539,396 B1 | 3/2003 | Bowman-Amuah | |
| 6,601,234 B1 | 7/2003 | Bowman-Amuah | |
| 6,871,232 B2 | 3/2005 | Curie et al. | |
| 6,981,043 B2 | 12/2005 | Botz et al. | |
| 6,993,508 B1 | 1/2006 | Major et al. | |
| 7,080,077 B2 | 7/2006 | Ramamurthy et al. | |
| 7,085,834 B2 | 8/2006 | Delany et al. | |
| 7,099,871 B2 | 8/2006 | Faybishenko et al. | |
| 7,103,676 B2 | 9/2006 | Payrits et al. | |
| 7,107,610 B2 | 9/2006 | Lortz | |
| 7,111,297 B1 | 9/2006 | Sankaranarayan et al. | |
| 7,113,994 B1 | 9/2006 | Swift et al. | |
| 7,114,037 B2 | 9/2006 | Agarwal et al. | |
| 2002/0023147 A1 * | 2/2002 | Kovacs et al. ............... 709/219 |

(Continued)

*Primary Examiner* — John R. Cottingham
*Assistant Examiner* — Mariela Reyes
(74) *Attorney, Agent, or Firm* — Austin Rapp & Hardman

(57) ABSTRACT

A system for provisioning content to at least one user is described. A content provisioning server is used. The content provisioning server includes a content provisioning application in communication with a user database. The content provisioning application is configured to access the user database to identify a user, determine rights of the user from the user database, and send a user interface to a client computing device that provides user interface items corresponding to the rights and associated links of the user.

11 Claims, 13 Drawing Sheets

U.S. PATENT DOCUMENTS

| | | |
|---|---|---|
| 2003/0065706 A1 | 4/2003 | Smyth et al. |
| 2004/0139207 A1 | 7/2004 | de Jong |
| 2005/0027797 A1 | 2/2005 | San Andres et al. |
| 2006/0080397 A1 | 4/2006 | Chene et al. |

* cited by examiner

SYSTEMS AND METHODS FOR PROVISIONING CONTENT FROM MULTIPLE SOURCES TO A COMPUTING DEVICE

RELATED APPLICATIONS

This application is related to and claims priority from U.S. Provisional Patent Application Ser. No. 60/827,841 filed Oct. 2, 2006, for PRESENCEID CONTENT PROVISIONING, with inventor David A. Doane, which is incorporated herein by reference; and This application is also related to and claims priority from U.S. Provisional Patent Application Ser. No. 60/828,015 filed Oct. 3, 2006, for PRESENCEID TREE MANAGER, with inventor Douglas Walker, which is incorporated herein by reference.

TECHNICAL FIELD

The present invention relates generally to computers and computer-related technologies. More specifically, the present invention relates to systems and methods for provisioning content from multiple sources to a computing device.

BACKGROUND

Computer and communication technologies continue to advance at a rapid pace. Indeed, computer and communication technologies are involved in many aspects of business operations. For example, a business may be located in numerous places with computers at each location. Computers may allow a business to maintain data relating to the business operations, customers, services, etc. Employees of a business may enter the data into the computers by utilizing business applications that run on the computers. Applications may also allow the employee to manage the data after it has been entered into the computer.

Data stored in a computer or a computer system is typically organized into a file, a database, or another type of data repository. It is not uncommon for an enterprise (e.g., corporation, small business, non-profit institution, government body, etc.) to have data stored in several different types of data repositories. There may be many reasons for this. For example, an enterprise may have inherited some data repositories as a result of mergers, acquisitions or the like with other enterprises. Alternatively, different departments within the same enterprise may have different needs which are best satisfied by different types of computer systems having different types of data repositories. The different data repositories maintained by an enterprise may be located in a variety of different computer systems, which may be dispersed around an office, around a campus, or even around the world.

Many businesses maintain many computer systems at various locations. A computer system at one location may differ from a computer system at another location. In particular, application, data and/or databases on one computer system may differ from application, data and/or databases on other computers.

As shown, many different kinds of data and computer systems may be used in today's workplace. Often employees need to use and/or access many different kinds of systems and data on an almost daily basis. As such, benefits may be realized by improved systems and methods for providing access for this content from multiple sources to one or more computing devices.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
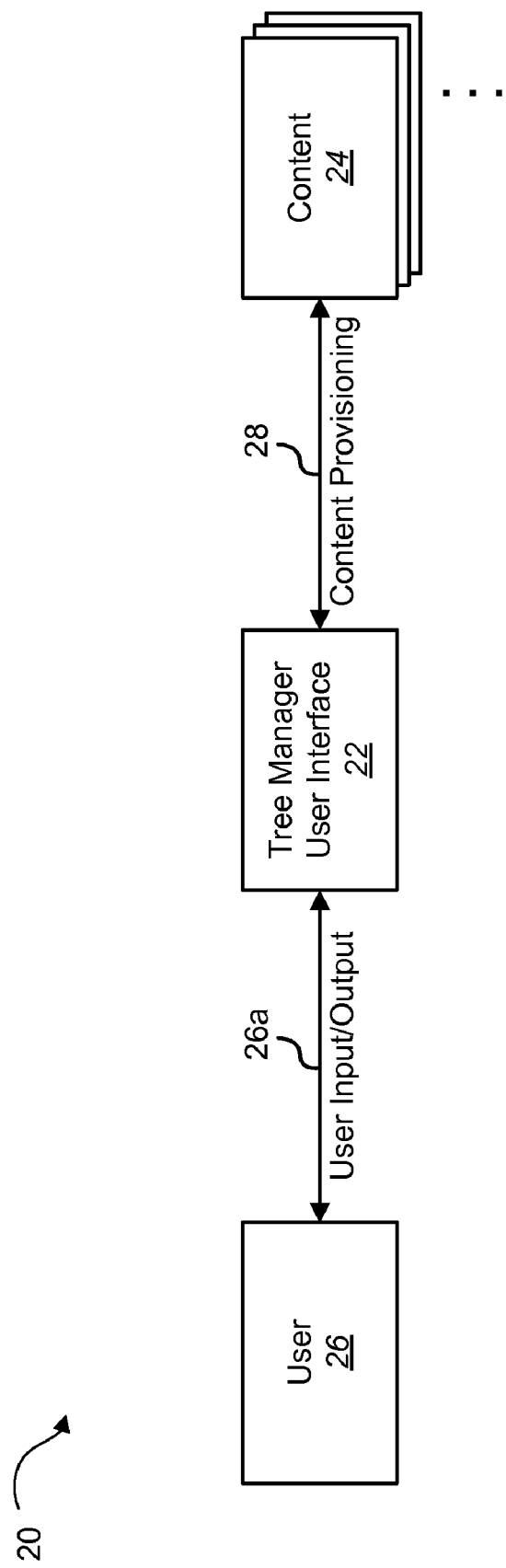
FIG. 1 is a block diagram illustrating one possible configuration of a system for using a tree structure as a user interface for provisioning content to a user.

A system for provisioning content to at least one user is described. A content provisioning server is used. The content provisioning server includes a content provisioning application in communication with a user database. The content provisioning application is configured to access the user database to identify a user, determine rights of the user from the user database, and send a user interface to a client computing device that provides user interface items corresponding to the rights and associated links of the user.

The content provisioning application may be further configured to access a tree manager database to obtain the user interface and to send tree manager code that provides the user interface to the client computing device.

The user interface may include a tree user interface. The tree user interface may include a list of content that the user has rights and associated links to access. The tree user interface may be for a web browser.

The content may include files, applications and systems. The content may further include services, links, web portals and mashup services.

In one configuration, a hub managing system may be used to manage the user database.

A method for provisioning content to at least one user is also described. User information is received from a client computing device. A user database is accessed to identify a user using the user information. Rights of the user are determined from the user database. A user interface is sent to the client computing device that provides user interface items corresponding to the rights and associated links of the user.

A system for provisioning content to at least one user is described. A content provisioning server is used. The content provisioning server includes a content provisioning application in communication with a user database. The content provisioning application is configured to access the user database to identify a user, determine rights of the user from the user database, and send a user interface to a client computing device that provides user interface items corresponding to the rights and associated links of the user. The client computing device includes a web browser for displaying the user interface. The client computing device also includes a queue structure for storing changes to the user interface.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

FIG. 1 is a block diagram illustrating one possible configuration of a system 20 for using a tree structure 22 as a user interface for provisioning content 24 (files, applications, systems and services) to a user 26. The details of different implementations of this system will be set forth below. User input/output 26a is handled by the tree manager user interface 22. The content provisioning 28 provides content 24 to the tree manager structure 22 or facilitates the content 24 being provided to the tree manager structure 22.

Figure 2:
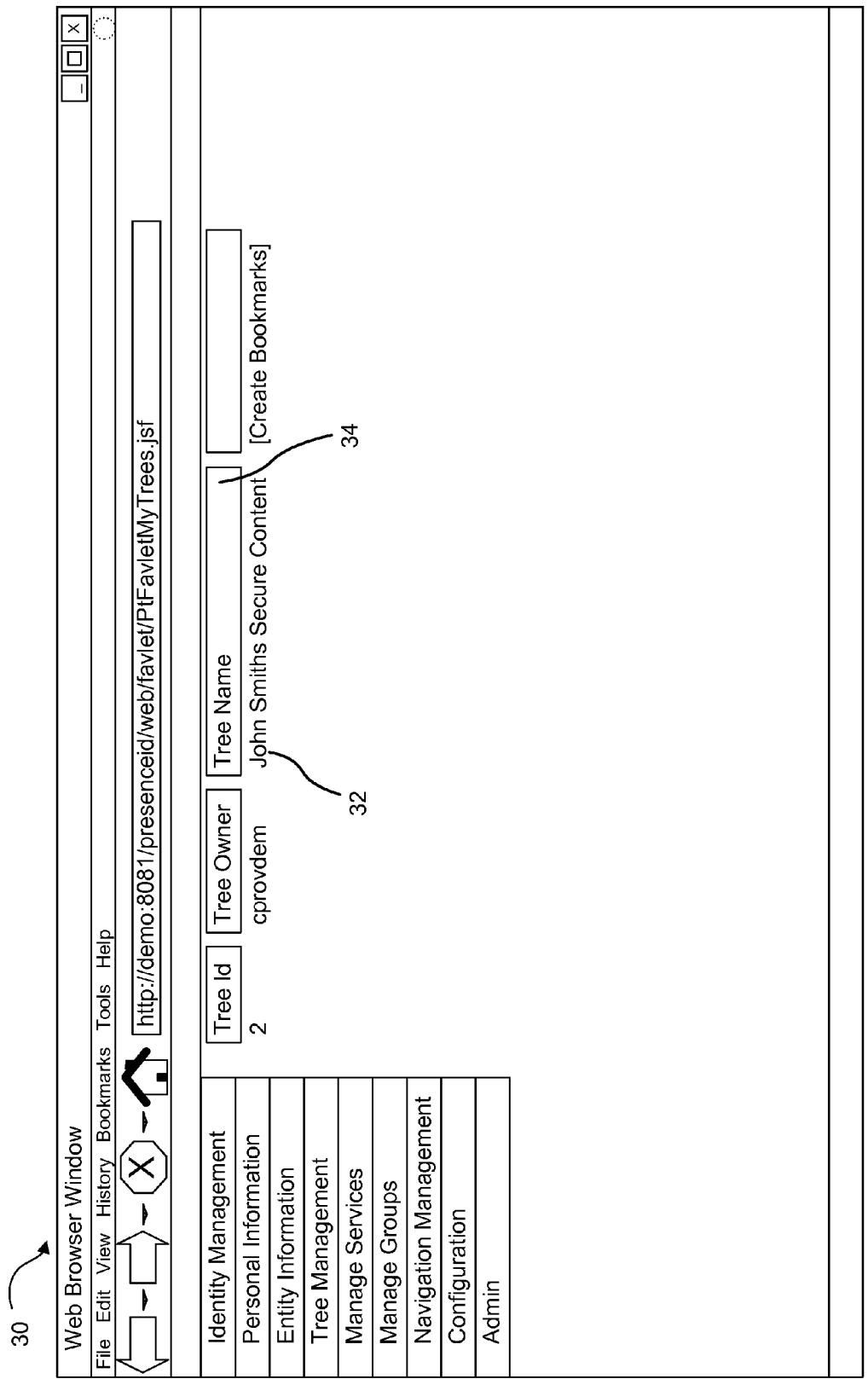
FIG. 2 is one possible configuration of a user interface showing a user's virtual directories.
Figure 3:
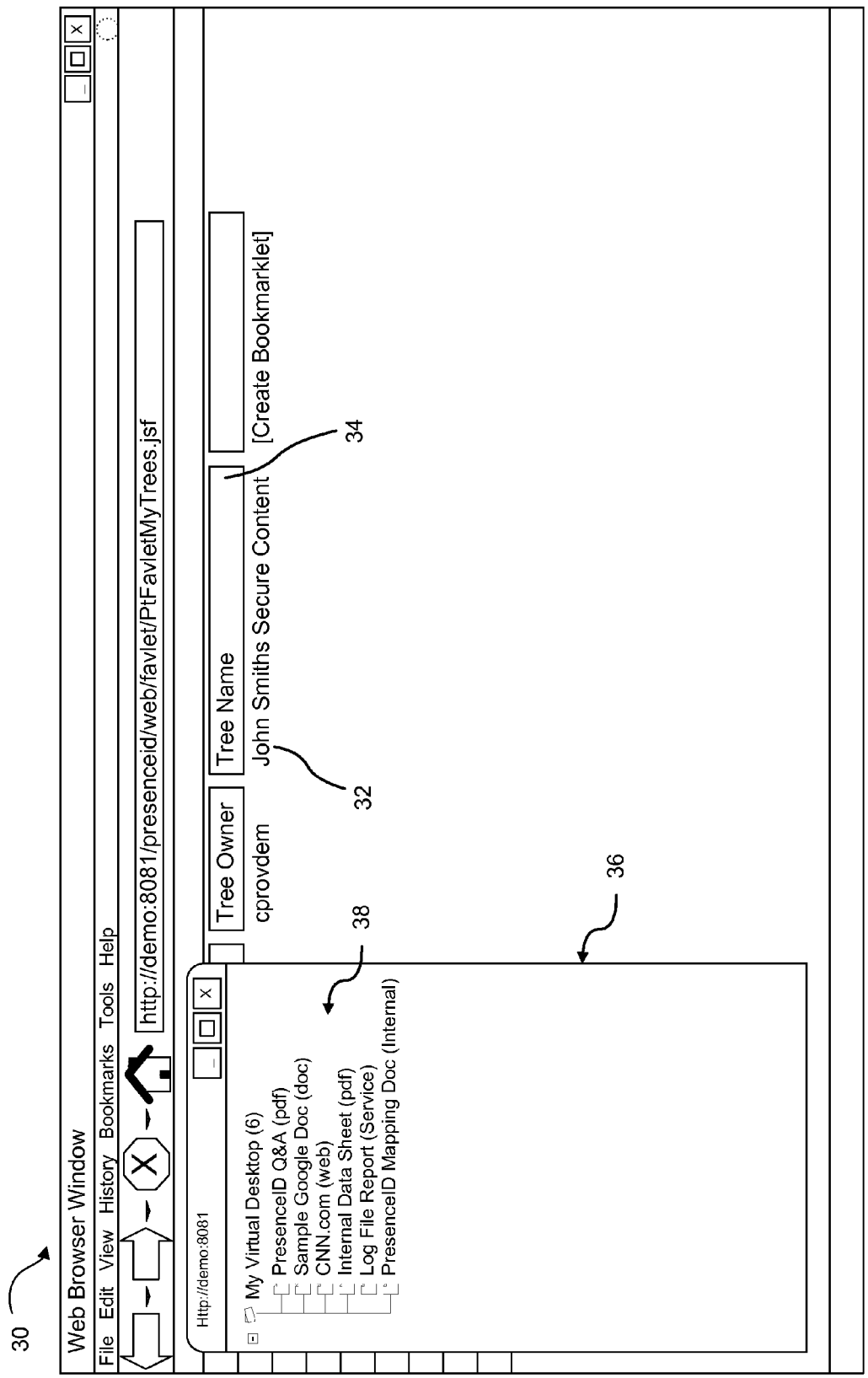
FIG. 3 is one possible configuration of a user interface showing a user's virtual directories.

FIG. 2 is one possible configuration of a user interface 30 showing a user's virtual directories. In the example shown in FIG. 2, this particular user has only a single virtual directory 32. Clicking on the "Tree Name" 34 may open up the particular virtual directory, an example of which is shown in FIG. 3. As is shown in the example user interface screens, a "tree" may be used.

A "tree" is a data structure that organizes data elements into a manageable structure. Tree data structures are typically arranged in a hierarchical data scheme. A tree structure may be used to handle different kinds of systems or data including, but not limited to, organizational structures in a business entity, or file systems on a computer system. With the advent of graphical interfaces, there are several different implementations to manage complex and unbalanced tree structures. As used herein, the graphical interface to manage the tree structures may be referred to as a tree manager.

FIG. 3 is one possible configuration of a user interface 30 showing a user's virtual directories. In the example shown in FIG. 3, this particular user has a virtual directory 36 with six linked items. A link is an address to any item that can be provided by a computing device including, but not limited to, a web page, a document, a file, a system, a database, a service or an application. In the implementation of FIG. 3, the virtual directory 36 is shown through another window. The tree structure 38 entitled "My Virtual Desktop" includes six linked items. The first item is a PDF (Portable Document Format) document entitled "PresenceID Q&A" that resides on a public web-server. The second item is a link to a Google document entitled "Sample Google Doc." The third item is a link to a website, CNN.com. The fourth item is a link to an internal PDF document, "Internal Data Sheet" on an internal web-server. The fifth item is a link to a web-application that performs various reporting processes, entitled "Log File Report." The sixth item is another link to an internal document on an internal web-server, "PresenceID Mapping Doc." These items are only shown as examples, and are not meant as limitations on what could be in a user's virtual directory 38.

The menu shown may be dynamically altered to reflect the authorizations of the current user. Menus may be represented in a variety of fashions. The sidebar menu 36 may be used in many enterprise applications. This technique may be used for provisioning content, or content provisioning.

Graphical user interfaces representing a tree structure can be a programming challenge. Many implementations of a tree structure are client-server applications, and may have substantial interaction with data structures.

Typical client/server tree structures implemented on the World Wide Web may operate in the following manner. The server may build a tree structure as HTML (Hypertext Markup Language) and send it to the web browser. For a tree of even moderate complexity, this is an involved process that will typically take several seconds on some systems. The web browser may then render the tree structure. The HTML stream often contains scripting language commands, which are often JavaScript. The scripts provide the capability to expand and contract the graphical representation of the tree. Rendering an edited tree can take several seconds for most web browsers. A common alternative to embedded JavaScript is that the browser returns to the server each time the graphical tree structure is edited. This process is slow from a user's perspective, and resource expensive from the system's perspective. Rendering an edited tree can often take several seconds for many Web browser implementations. The user may then modify the tree structure displayed in the browser. The edit is sent to the server. The server may then modify the data structure of the tree and repeat this process for the next edit.

The present systems and methods may use a tree structure to solve several different problems. First, an unbalanced tree structure is an excellent manner to catalog and organize the products and services that an enterprise wishes to organize, manage, and provision. These services may be application-oriented (web pages, reports, application services), machine-oriented (servers, peripherals, network connections), or content-oriented (data, files, graphical content). Since a tree structure groups services, it facilitates the process of granting authorization to a group of services, rather than requiring an administrator to enumerate each individual service as is common today. In the various configurations herein, changing the tree structure of services may automatically adjust authorizations to applications, machines and services.

A tree structure may be used to represent the organization of an enterprise entity. Content may be associated with different points and levels of the organization creating an authorization scheme that is easy to understand, organize, and maintain.

Most tree structures are read many thousands of times for every instance they are modified and edited. Most common tree structures in use today are not implemented to optimize read activity. The process of reading a tree data structure is a processor intensive activity for the underlying data store system, usually a relational database management system (RDBMS), because it requires many individual read requests. This intensive database read activity often translates into poor end-user client display performance, especially for web applications with the extra burden of securely transmitting and rendering HTML screens that can be displayed by a browser. On the other hand, update activity is relatively quick and does not require much in the way of resources to process.

A tree manager 90 (shown in FIG. 5) may manage changes and edits to the tree structures in a manner that reduces resource and time requirements. One optional feature of the tree manager 90 may be to quickly and inexpensively resolve which nodes of the tree belong to a higher-level node of the same tree. Another optional feature of the tree manager 90 may be to quickly resolve which higher-level nodes of the tree own a particular node. These two activities may be relational queries rather than a resource expensive recursive query, the technique most often employed in systems and application tree structures. This is accomplished by employing a sequential key in the tree manager database 78 for all of the nodes of the tree structure. The sequential key assures that all of the children nodes for any particular parent node will be represented by a discrete range of keys. The key of the parent can be used to determine the lower bound of the range. The upper bound of the range is stored with the parent node. To maintain this structure the entire tree structure may be modified with each change or edit.

In one configuration, the tree structure is modified with each change or edit. The tree manager 90 may not require any dedicated client code or plug-ins for the browser to manage, edit, or display its tree structure. Thus, the client machine does not need to be altered.

Some code may be sent to the browser with the rendering of the tree structure. In one possible configuration, JavaScript (code) is sent to the browser with the HTML rendering of the tree structure. The result is a responsive, full-featured tree manager 90 that manages the complexities of the tree structure and creates a responsive and positive user experience.

Figure 4:
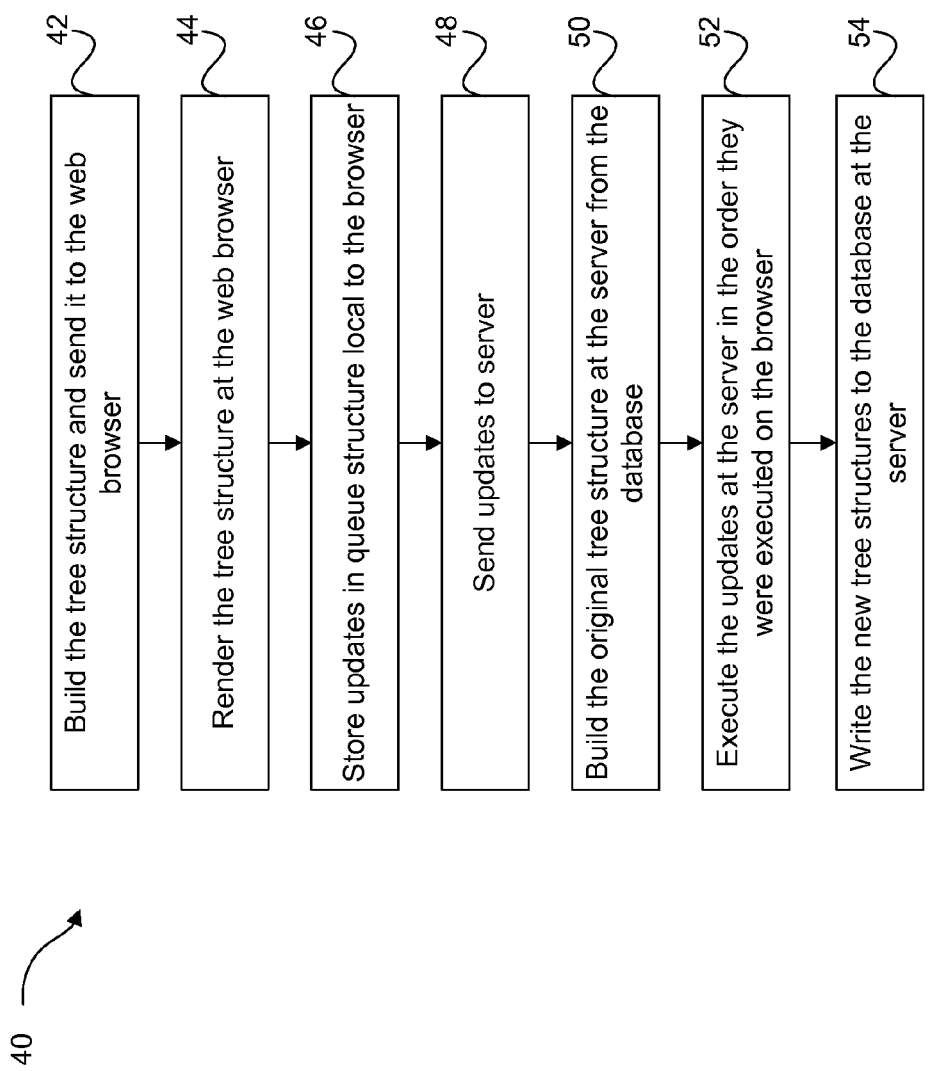
FIG. 4 is one possible configuration of a method for the tree manager.

FIG. 4 is one possible configuration of a method 40 for the tree manager 90. The server 56 may build 42 the tree structure as HTML and send it to the web browser 60. In one particular implementation, JavaScript is included to manage the user interface. For a tree of even moderate complexity, this is an involved process that will take several seconds. The web browser 60 then renders 44 the tree structure. The tree manager 90 functionality may allow the tree structure to be expanded or contracted.

The user examines, and potentially modifies, the tree structure in the browser 60. In one possible implementation, the update events are not sent to the server 56 at this point. The discrete transactions are stored 46 in a queue structure 92 on the browser 60 or local to the browser 60. When the user decides to save the changes and edits to the tree structure, the queue 92 of update events 94 may be sent 48 to the server 56 as a hidden field in the HTML form.

The server builds 50 the original tree structure from the database and then executes 52 the update transactions in the order they were executed on the browser 60. The result is a new tree structure that the operator can then save.

The server 56 writes 54 the new tree structures to the database 78. In the process all of the records of the original tree structure are replaced. This process assures that the nodes are arranged with sequential keys and that each parent nodes is stored with the upper bound of the children nodes. This process may be repeated as needed for each tree structure served up to a browser 60.

Figure 5:
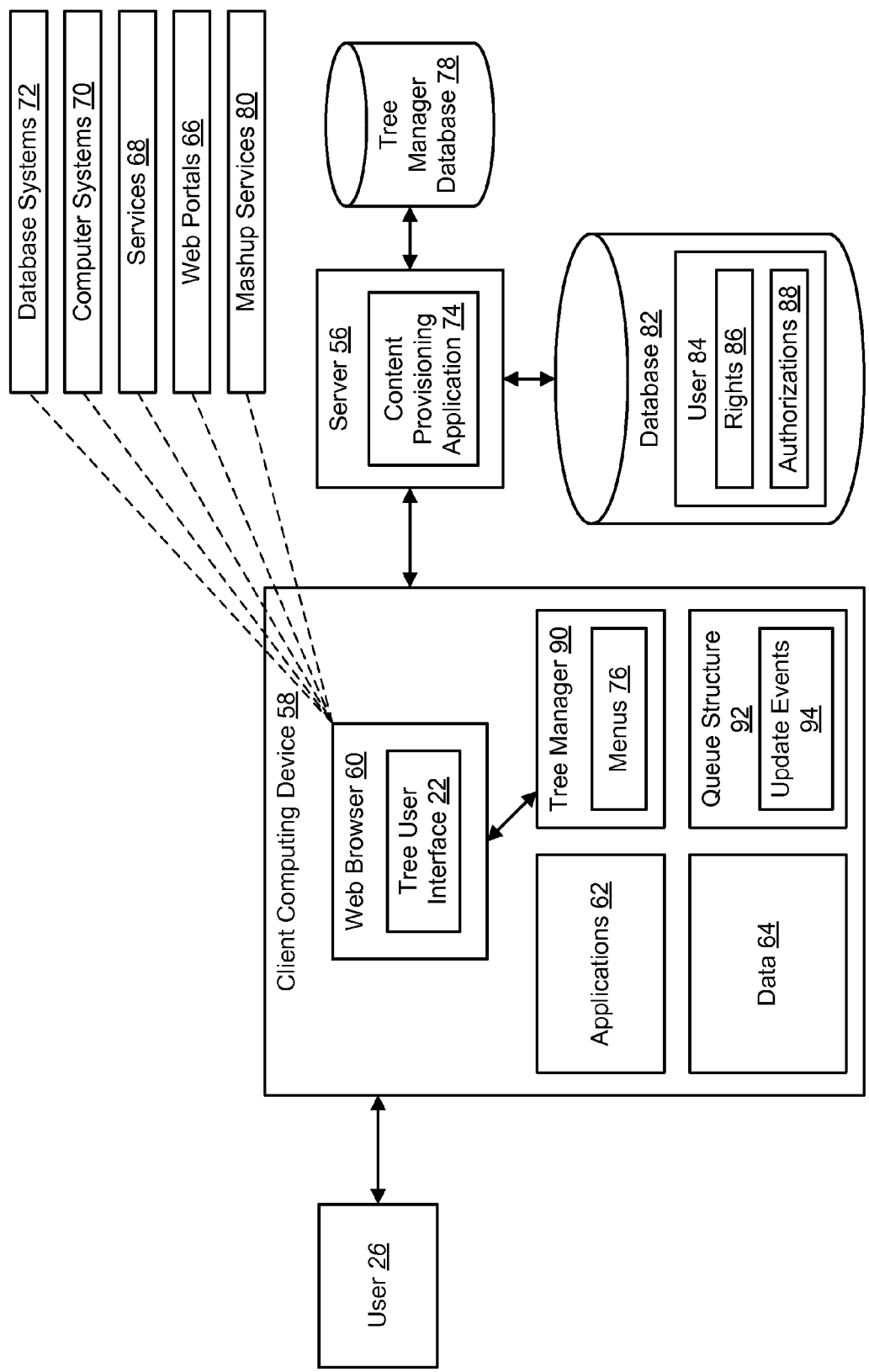
FIG. 5 is a block diagram of content provisioning from a server to a client computing device for a user.

FIG. 5 is a block diagram of one possible configuration to illustrate content provisioning from a server 56 to a client computing device 58 for a user 26. Various kinds of content may be provided via the server 56 to the user 26 through a web browser 60 running on the client computing device 58. Content provisioning may use a tree structure user interface 22, as shown above, to manage authorizations. The authorizations may be for any content (files 64, folders 64, applications 62, web portals 66 and services 68) for which a user is authorized to have access to. The content may be local or remote from the client computing device 58. For example, remote database systems 72, computer systems 70, etc. may be provisioned to the user 26. A content provisioning application 74 allows menus and content to be attached to a menu tree 22. This process delivers a very flexible method to manage a variety of content and services. Content provisioning may also include content from the local machine 58. Content provisioning can be personalized by each machine's operator to include any files, applications and services to which they have authorization.

In operation, the content provisioning application 74 checks the rights 86 and authorizations 88 of a user 84 in a user database 82, and then the application 74 provides a tree structure user interface 22 to the tree manager 90 that shows what content the user has access to. In some implementations, the tree user interface 22 does not show content that the user does not have authorization for. Referring back to FIG. 3, the particular user would have rights to each of the items in the tree structure 38 shown in the virtual directory 36.

Content provisioning offers the option of presenting the menu of options using the browser's 60 inherent capabilities. Most browsers have the ability to create a tree-like menu of "favorites" or "bookmarks". Bookmarks and favorites are a list of URL's and/or local machine file names that are organized and managed by the computer's operator.

Content provisioning installation may present a web page with the ability to download a menu to the browsers "favorites" or "bookmarks" to the user's local machine 58. During installation, the content provisioning detects content provisioning generated menus 76 that were previously downloaded and allows the user the option of replacing them. In one possible implementation, content provisioning does not require a plug-in to the browser 60 or alter the local machine's 58 configuration to which the browser 60 is installed.

At installation, content provisioning 74 may detect the type of browser 60 that the user 26 is employing and transmit a web page containing the appropriate menu structure to be built and JavaScript code (in one possible implementation) that can be executed to deploy the menu. The content provisioning application 74 running on the server 56 may access a tree manager database 78 to obtain the tree structure menu to transmit to the user 26. The user 26 may execute the code to create the menu structure by simply pressing a button on the web page. The menu structure is then deployed to the "favorites" or "bookmarks" section of the browser 60. The code to create the menu structure may be JavaScript which employs commands native to the browser 60.

Content provisioning can aggregate and provide content that any given user is authorized to have access too. Content can be files, applications, systems, services, links, portals, individually or in combination. Combining content into a compound service can be accomplished in a number of technologies, for example a batch file that executes a series of commands on a variety of applications sequentially. Code that is written to create a new application using other existing applications is often called a "mashup." A mashup service 80 may be provisioned the same as any other piece of content, to users who are authorized to access it.

The contents within a mashup may include data and applications from any system, regardless of architecture and physical location. Additionally, a mashup service 80 requires no changes to the constituent content data, files, applications or services. Using mashup services 80, content provisioning is able to provision mainframe-based data and applications as easily as a client server, peer-to-peer (P2P), distributed, software-as-a-service (SaaS) with this mashup service capability, with no changes to the data and applications.

The content provisioning application 74 may provide rights-based management of simple and compound content services in a service oriented architecture, to a tree structure 22 in a browser 60. The content provisioning application 74 may access a database 82 to obtain the rights 86 and/or authorizations 88 of a particular user 84.

Many different kinds of databases may be used to store and manage information relating to a user 26 and content 24. For example, a database 82 may store many user records 84 that include data attributes for the user's rights 86 and authorizations 88. These different kinds of databases may be used in combination with the content provisioning discussed herein. One possible implementation of a database management system that has the ability to integrate multiple databases and/or systems will be set forth below with references to FIGS. 6-13. Although the discussion in FIGS. 6-13 may be more general in its description, the systems and methods therein may be used as an exemplary database system for managing users, data, content, services, etc.

Most business applications include two general types of data. The first may be transactional data. Examples of transactional data may include orders, shipments, invoices, payments, etc. Transactional data may utilize a high degree of control in order to maintain its integrity. This type of data may be managed by a single, highly integrated application, which may be highly dynamic or attended by a large volume of activity.

The second type of data may include reference data. Examples of reference data may include customers, employees, products, services, accounts, locations, etc. While an important level of control may be utilized in order for reference data to maintain its integrity, it may be common for several business applications in an enterprise to maintain the same reference data. It may be beneficial if this type of data could be created, edited, changed, deleted, etc. by each individual business application in the manner that is was designed to function. Further, it would be beneficial if each individual business application could share common data with the other business applications in the enterprise. For example, it may be beneficial if all of the systems in a business that deal with a certain customer could identify that customer in the same way.

Transactional data may be controlled by tightly-coupled data management techniques. For example, a change to an order amount may occur in the same database transaction that affects the inventory levels of the product. However, tightly-coupled application systems are more expensive to develop and maintain than loosely-coupled application systems.

Reference data generally doesn't require tightly-coupled data management techniques. Instead, this type of data can generally be handled with loosely-coupled data management techniques. A change to an individual's address in one application should be shared with all of the other applications within the business enterprise, but it may be acceptable if it takes several seconds or minutes to synchronize this changed data with the other applications.

The present systems and methods enable a business enterprise to loosely-couple reference data with the multiple business systems, applications and infrastructure. The present systems and methods may loosely-couple reference data with asynchronous messages which may guarantee delivery of the message to each system and application within the business enterprise. For example, the present systems and methods allow an application to complete a change to an attribute associated with reference data and continue the normal operations the application is designed to perform. The present systems and methods may operate in the background and send a message including information about the change to additional systems and applications within the business enterprise. When the additional applications are available, they may accept the message and process the change.

A benefit of the present systems and methods is that if any systems are unavailable for any reason (i.e. off-line) the integrity of the reference data will not be jeopardized. The remaining systems that are available will continue to be synchronized and continue with accurate, updated data attributes.

Current systems and methods generally require data structures of the different applications to be identical or very similar. At the very least, the reference data typically has been required to share a common data attribute that uniquely identifies reference data. Such requirements have not enabled current systems and methods to be sufficiently loosely-coupled. Further, it is expensive for dissimilar applications to share reference data.

Figure 6:
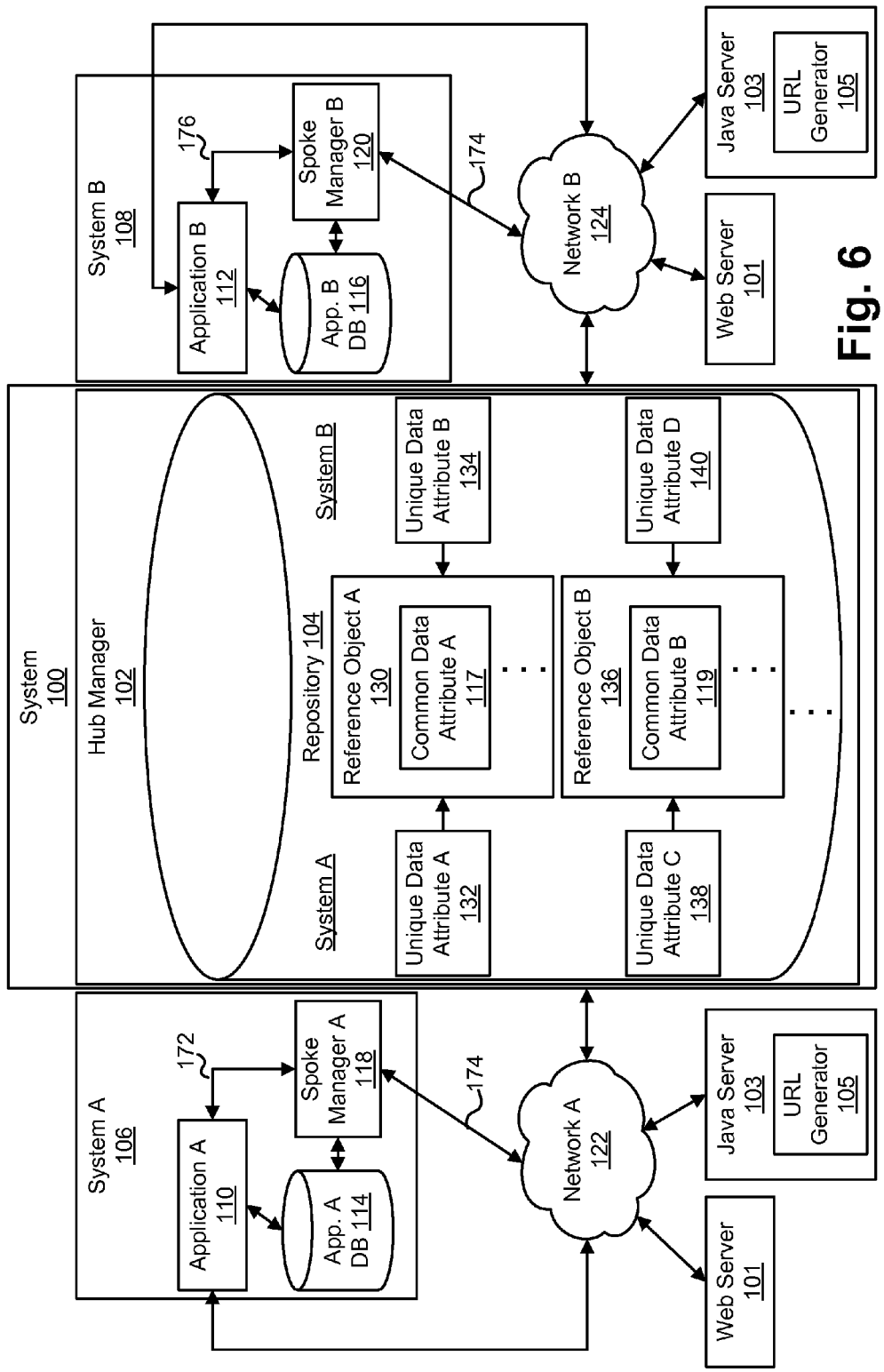
FIG. 6 is a block diagram illustrating one embodiment of a system in communication with a plurality of systems and applications.

FIG. 6 is a block diagram illustrating one embodiment of a system 100 in communication with system A 106 and system B 108. Although FIG. 6 only depicts the system 100 in communication with the two systems 106, 108, it is to be understood that the system 100 may be in communication with more than two systems. For example, numerous systems may be connected in a star configuration with the system 100 at the center. In some embodiments the different systems 100, 106, 108 may be located in different geographic regions across a country and/or across the world. In other embodiments the different systems 100, 106, 108 may be located within the same facility.

System A 106 and system B 108 may include any type of computing device such as a personal computer, laptop, personal digital assistant (PDA), computer server, etc. Systems A and B 106, 108 may include application A 110 and application B 112, respectively. Applications A and B 110, 112 may include software that employs the capabilities of systems A and B 106, 108 to execute a task. In one embodiment, applications A and B 110, 112 may utilize different data structures. Different data structures may be suited to different types of applications, such as applications A and B 110, 112.

Systems A and B 106, 108 may also include application A database 114 and application B database 116, respectively. The databases 114, 116 may include a stored collection of data that may be accessed by applications A and B 110, 112. In one embodiment, systems A and B 106, 108 may also include spoke manager A 118 and spoke manager B 120, respectively. Spoke managers A and B 118, 120 may send/receive data to/from applications A and B 110, 112, respectively. In addition, spoke managers A and B 118, 120 may send/receive data to/from application A database 114 and application B database 116, respectively. In one embodiment, spoke manager A 118 sends/receives data to/from application A 110 in a first format 172. In another embodiment, spoke manager B 120 sends/receives data to/from application B 112 in a second format 176. The first format 172 may be different from the second format 176. Spoke manager A 118 may also send/receive data to/from the system 100. In one embodiment, spoke manager A 118 sends/receives data to/from the system 100 in a third format 174. In another embodiment, spoke manager B 120 also sends/receives data to/from the system 100 in the third format 174.

Spoke managers A and B 118, 120 may communicate with the system 100 over network A 122 and network B 124, respectively. While the illustrated embodiment only illustrates two networks, it is to be understood that the system 100 may communicate with any number of systems over any number of networks. In one embodiment, the system 100 includes a hub manager 102. The hub manager 102 may act as a broker for all the data sent to or received from the various systems and applications. For example, the hub manager 102 may send/receive messages to/from the various systems and applications. In one embodiment, the hub manager 102 may include a repository 104. The repository 104 may store data included within the various systems communicating with the system 100, such as systems A and B 106, 108. In one embodiment, repository 104 may include a plurality of reference objects, such as reference object A 130 and reference object B 136. Reference object A and B 130, 136 may be a record of data relating to the identity of an individual, product, etc. For example, reference object A 130 may be an employee record and reference object B 136 may be a customer record. Each reference object includes common data attributes. Reference object A 130 may include common data attributes A 117 and reference object B 136 may include common data attributes B 119. Common data attributes may include data that is shared between systems, such as system A 106 and system B 108. An example of a common data attribute may include the name of the entity being identified by the reference object. Further examples of common data attributes may include an address, date of birth, email address, etc.

In one embodiment, spoke managers may be deployed to each system and application within a business enterprise. Spoke managers may communicate directly with the hub manager 102 and translate standard messages sent from the hub manager 102 to the system or application. Data translations or data transformations may include data mapping and data formatting. In one embodiment, data mapping identifies the location of specific required data in a table of one system and application and "maps" it to a location of data with the same attributes of another system and application. In one embodiment, data formatting defines a physical format of the data.

Each spoke manager may be very specific to the particular business system or application on which it resides. Including spoke managers with every system and application may allow a business enterprise to scale more easily. For example, the addition of another business application simply means adding a new spoke manager specific to that application. In one embodiment, adding additional systems or applications does not require changes to the hub manager 102 because the spoke manager provides the translation of data formats between the systems and applications and the hub manager 102. In one embodiment, business systems and applications may be deployed on a variety of technology platforms, data management tools and application development environments.

Spoke manager A 118 and spoke manager B 120 may implement a unique data attribute to uniquely identify each reference object. For example, spoke manager A 118 may implement unique data attribute A 132 and spoke manager B 120 may implement unique data attribute B 134 to identify reference object A 130. Similarly, spoke manager A 118 may implement unique data attribute C 138 and spoke manager B 120 may implement unique data attribute D 140 to uniquely identify reference object B 136. In one embodiment, the repository is aware of each unique data attribute and the value of such attribute that each spoke manager implements to identify a particular reference object. The following scenario may further illustrate this concept.

A human resource system of a business may implement the unique data attribute of "Employee_id" to uniquely identify the reference object of an employee record of the employee associated with the employee identification indicated by "Employee_id". An accounting system of the same business may use the unique data attribute of "Employee_tax_id" to uniquely identify the employee record of an employee. For purposes of illustration, the "Employee_id" may be "789" and the "Employee_tax_id" may be "A52". The employee record may include one or more common data attributes, such as name, address, date of birth, etc. In one embodiment, the employee with the "Employee_id" of "789" may change his/her address through an application on the human resource system. The accounting system may not be able to be updated with the new address because the accounting system identifies employee records with a different data attribute (i.e., "Employee_tax_id").

In one embodiment, the repository 104 stores the employee's information such that the hub manager is aware that the employee identification is "789" and the employee tax identification is "A52". The repository 104 may translate a message associated with "Employee_id=789" that is updating a common data attribute to a message that includes "Employee_tax_id=A52" before the message is sent to the accounting system.

In this embodiment, the hub manager 102 is aware of which unique data attribute (and its value) each spoke manager uses to uniquely identify a reference object. The hub manager 102 is also aware of each of the plurality of reference objects that a particular enterprise may use (i.e., employee records, customer records, product record, etc.). Further, the hub manager 102 is aware of each common data attribute included with each reference object. The repository 104 associates each reference object with the unique data attribute each spoke manager uses to uniquely identify the reference object.

Figure 7:
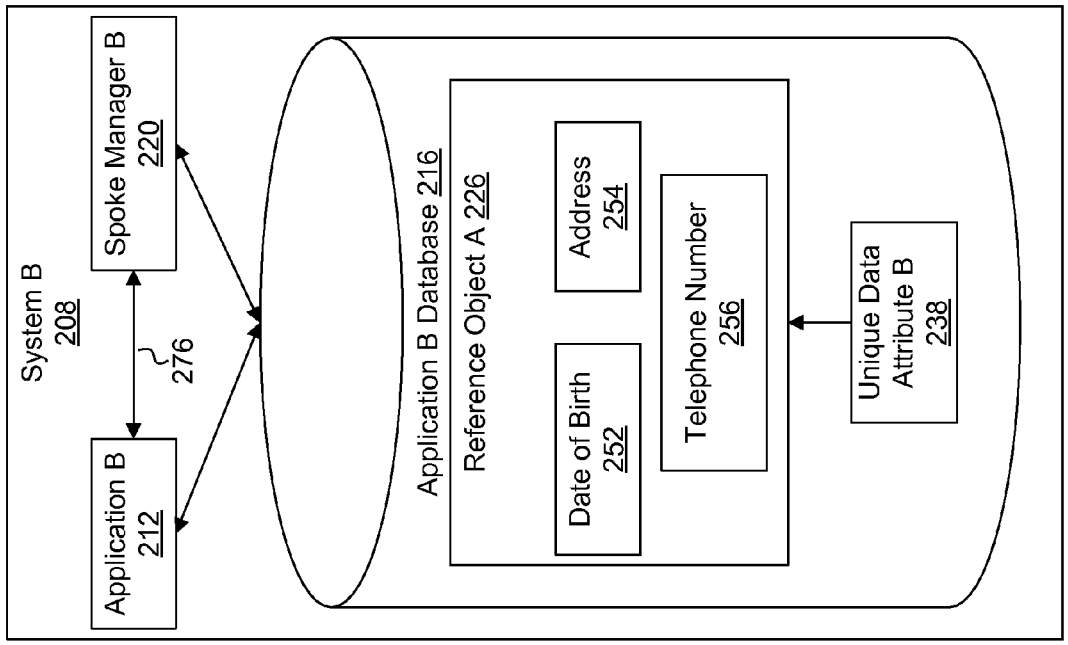
FIG. 7 is a block diagram illustrating embodiments of databases.
Figure 7:
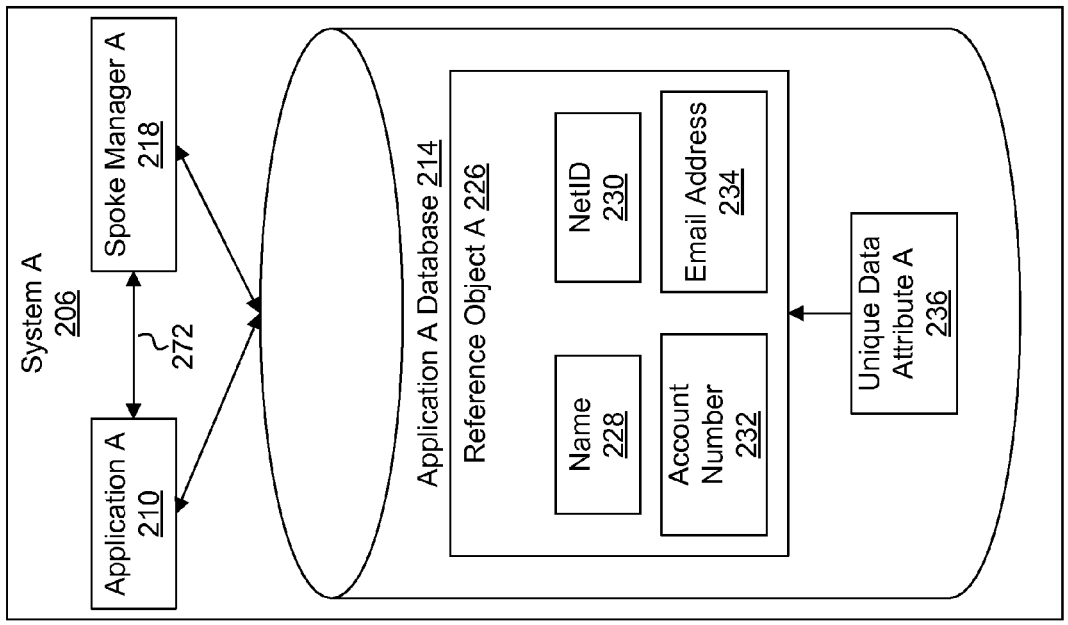

FIG. 7 is a block diagram illustrating embodiments of databases. As illustrated, spoke manager A 218 may send/receive data to/from application A 210 using a first data format 272. Spoke manager B 220 may send/receive data to/from application B 212 using a second data format 276. Applications A and B 210, 212 may obtain data from application A database 214 and application B database 216, respectively. In one embodiment, spoke manager A 218 may communicate directly with application A database 214 and spoke manager B 220 may communicate directly with application B database 216.

Application A database 214 and application B database 216 may include one or more reference objects, such as reference object A 226. Reference object A 226 may identify a particular type of entity that is associated with one or more common data attributes. For example, reference object A 226 may identify customers, employees, business entities, products, services, accounts, locations, etc. In one embodiment, reference object A 226 may include common data attributes relating to the entity identified by reference object A 226. In the depicted embodiment, the reference object A 226 identifies a customer and may include common data attributes further relating to the identity of the customer. It is to be understood that additional reference objects may include common data attributes that further relate to the identity of other entities in addition to customers. In one embodiment, reference object A 226 includes common data attributes such as name 228, NetID 230, account number 232 and email address 234. While only four examples of common data attributes are listed, it is to be understood that reference object A 226 may include other common data attributes. For example, common data attributes may include date of birth, residential address, business address, social security number, account numbers, etc.

Spoke manager A 218 and spoke manager B 220 may each uniquely identify the reference object A 226 with a different unique data attribute. For example, spoke manager A 218 may identify reference object A 226 using unique data attribute A 236 while spoke manager B 220 identifies reference object A 226 using unique data attribute B 238.

In addition, application A 210 and application B 212 may use different common data attributes of reference object A 226. For example, application A 210 may use the common attributes of name 228, NetID 230, account number 232 and email address 234. Application may use the common data attributes of data of birth 252, address 254 and telephone number 256.

Figure 8:
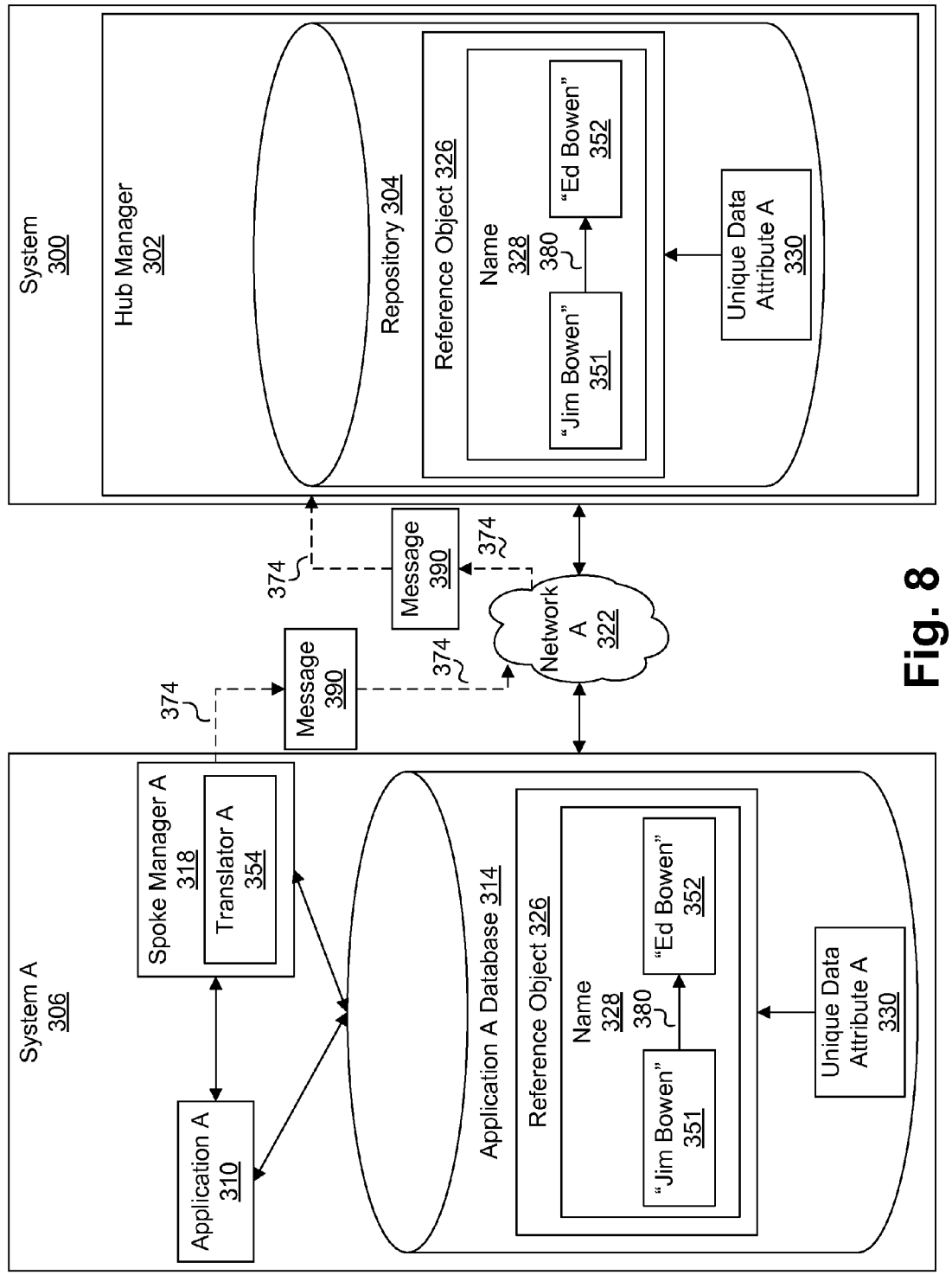
FIG. 8 is a block diagram illustrating one embodiment of spoke manager sending a message to a hub manager.

FIG. 8 is a block diagram illustrating one embodiment of spoke manager A 318 sending a message 390 to a hub manager 302. While only system A 306 is illustrated with spoke manager A 318 communicating with the hub manager 302, it is to be understood that additional systems and spoke managers may communicate with the hub manager 302 in a similar manner as explained below. In one embodiment, system A 306 communicates with a system 300 over network A 322. Application A 310 and spoke manager A 318 may be included within system A 306. In one embodiment, application A 310 facilitates a customer to provide data associated with common data attributes. For example, the customer, using application A 310, may provide the name "Ed Bowen" 352. Application A 310 may communicate the name "Ed Bowen" 352 to application A database 314. Application A database 314 may store the name "Ed Bowen" 352. In one embodiment, the name "Ed Bowen" 352 is associated with the common data attribute of name 328. The name attribute 328, as previously explained, may be included as a common data attribute of reference object 326. In this example, the reference object 326 may be a customer record that identifies a particular customer.

In one embodiment, application A database 314 may have previously stored the name "Jim Bowen" 351. When application A 310 communicates the name "Ed Bowen" 352 to application A database 314, the name "Jim Bowen" 351 may change 380 to the name "Ed Bowen" 352. This scenario may illustrate the situation where the first name entered, "Jim Bowen", was incorrect and should have been "Ed Bowen." In this embodiment, the common data attribute of name 328 is changed.

In one embodiment, spoke manager A 318 may send a message 390 including the change in the common attribute of name 328 to the hub manager 302. In an additional embodiment, the message 390 may include all the common data attributes included with the reference object 326. For example, the reference object 326 may include several common data attributes, such as email, NetID, address etc. A change to any common data attribute, such as the may cause a synchronization message 390 to be sent which includes all of the common data attributes of the reference object 326. In other words, the message 390 may include common data attributes that have not been modified. In the illustrated example, the hub manager 302 detects from the synchronization message that a common data attribute of the reference object 326 has changed.

Spoke manager A 318 may gather all the common data attributes of the reference object 326 and perform data translations if necessary. Spoke manager A 318 may package the message 390 in a first data format 374. In one embodiment, spoke manager A 318 includes translator A 354 which facilitates the translation of the reference object 326 if necessary. The message 390 may be in the form of a simple record that includes unique data attribute A 330. Unique data attribute A 330 may be used by spoke manager A 318 to uniquely identify the reference object 326. Spoke manager A 318 may send the message 390 to the hub manager 302 over network A 322. Changes to common data attributes associated with the reference object 326 may be communicated to the hub manager 302. In a further embodiment, application A 310 updates reference information by writing a queue record in application A database 314. Spoke manager A 318 may monitor the database 314 and take action based on the queue records in the database 314. In another embodiment, application A 310 may not include an application programming interface (API) that spoke manager A 318 may work with. In this instance, spoke manager A 318 may access data directly from application A database 314.

In the illustrated example, the hub manager 302 detects from the synchronization message 390 that a common data attribute of the reference object 326 has changed. In one embodiment, the hub manager 302 may define a packet of information for the reference object 326 which includes all the common data attributes of the reference object 326. The packet of information included in the hub manager 302 may be a superset of data from each system and application including the reference object 326. In one embodiment, the hub manager 302 maintains a repository 304 with the reference object 326 and each of the common data attributes of the reference object 326. In addition, as previously explained, the repository 304 includes which unique data attribute each spoke manager of various system uses to unique identify the reference object 326.

In one embodiment, the hub manager 302 may receive the message 390 which includes unique data attribute A 330. The hub manager 302 is aware that spoke manager A 318 uses unique data attribute A 330 to identify the reference object 326. The hub manager 302 may processes the message 390 in order to update the common data attributes associated with the reference object 326 stored in the repository 304. For example, the common data attribute of name 328 is changed 380 from "Jim Bowen" 351 to "Ed Bowen" 352.

Figure 9:
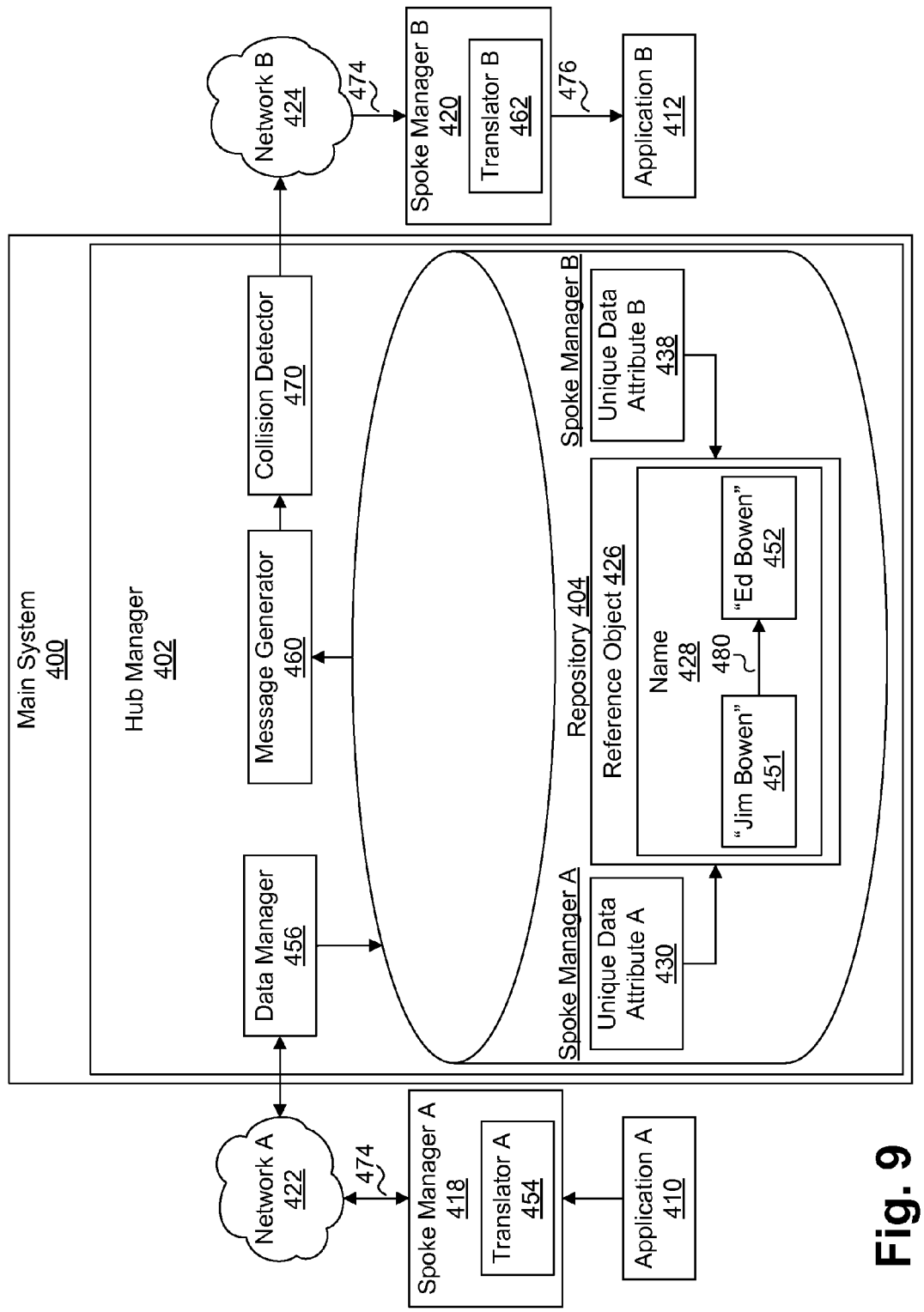
FIG. 9 is a block diagram illustrating one embodiment of a hub manager sending a synchronization message to additional applications.

FIG. 9 is a block diagram illustrating one embodiment of a hub manager 402 sending a synchronization message to additional spoke managers. In one embodiment, spoke manager A 418 may build a message in a first data format 474. Translator A 454 may be used to format the message in the first data format 474. In other words, each spoke manager sends/receives messages to/from the hub manager 402 in a single format per reference object. The message may include all the common data attributes associated with the reference object stored in application A database (not shown). The first data format 474 indicates the unique data attribute being used by spoke manager A to uniquely identify the reference object 426.

Spoke manager A 418 may send the message in the first data format 474 to a data manager 456 over network A 422. In one embodiment, the data manager 456 is included within a hub manager 402. In one embodiment, spoke manager A 418 may require additional information in order to build the message. Additional information may be retrieved from the hub manager 402 in order to build a complete message. For example, the additional information may be retrieved through synchronous web services messages. In one embodiment, the data manager 456 receives requests from spoke manager A 418 for the web services.

The hub manager 402 processes the message and determines which reference object is identified from the unique data attribute included in the message. In this example, the message includes unique data attribute A 430 which identifies the reference object 426. In one embodiment, the common data attribute of name 428 included in the reference object 426 is changed 480 from "Jim Bowen" 451 to "Ed Bowen" 452. The reference object 426 stored in the repository 404 may be updated with the changed common data attribute included in the message.

A message generator 460 may generate a synchronization message that includes updates to any of the common data attributes of the reference object 426. A collision detector 470 may be used before the hub manager sends synchronization messages to other spoke systems to notify them of any updates to common data attributes. The collision detector 470 detects the most recent synchronization message for a given reference object and only allows the most current messages generated by the message generator 460 to be sent to additional spoke managers. Collision detection occurs when a particular spoke system is synchronized on a scheduled time interval as opposed to an on-demand synchronization. In one embodiment, the hub manager 402 is aware which spoke managers are configured for a scheduled synchronization and when that is to occur. Synchronization messages may be placed in a cue between scheduled synchronization events and only the most recent messages are sent and the others are discarded at that time. The collision detector 470 verifies that only the most accurate common data attributes are included on each reference object in every spoke system that needs that particular common data attribute.

The synchronization message may be sent to application B 412, through spoke manager B 420. Because the hub manager 402 is aware that spoke manager B 420 uses unique data attribute B 438 to identify reference object 426, the message may include unique data attribute B 438. Spoke manager B 420 may receive the message in the first data format 474 (with unique data attribute B 438). In one embodiment, translator B 462 translates the message to a suitable format that may be used by application B 412 or application B database. In one embodiment, the message may be a series of messages/requests depending on the API of application B 412. Spoke manager B 420 may communicate directly with application B database if application B 412 does not allow a public API. Spoke manager B 420 translates the message, becomes aware that the message pertains to common data attributes of the reference object 426 (because of unique data attribute B 438). The message includes all the common data attributes associated with the reference object 426. Spoke manager B 420 determines which common data attributes are applicable to the reference object used by application B 412. In other words, spoke manager B 420 may ignore some of the common data attributes in the message if they do not pertain to application B.

In some embodiments, a unique data attribute may be changed. For example, referring to the previous example, the human resource system may change the employee tax identification for an employee from "A52" to "B46". In this example, the "Employee_tax_id" is used by the spoke manager B 420 to uniquely identify the employee record. The hub manager 402 may generate a key change message if the unique data attribute used by another spoke manger is altered.

Figure 10:
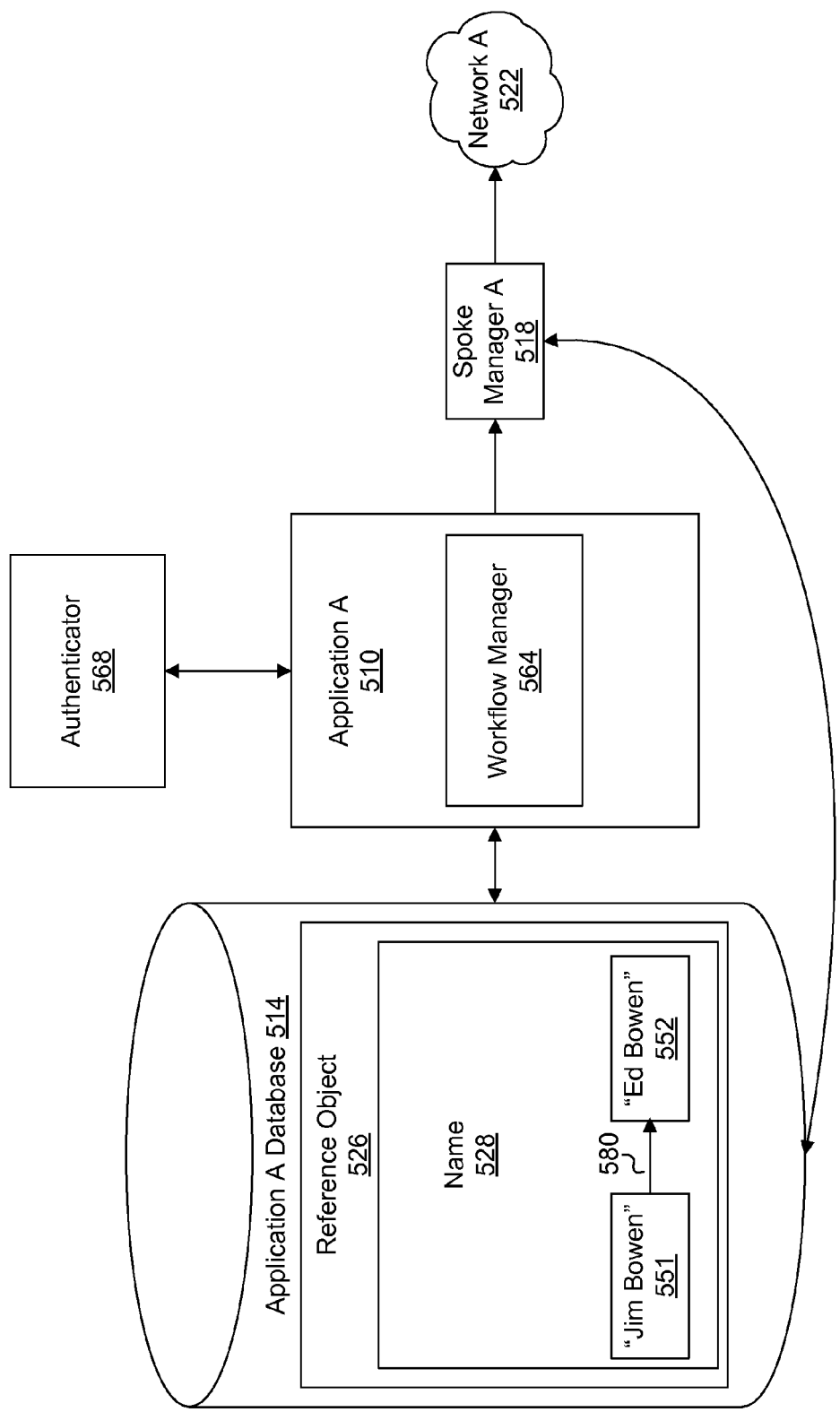
FIG. 10 is a block diagram illustrating one embodiment of a potential change in a common data attribute being authenticated.

FIG. 10 is a block diagram illustrating one embodiment of a potential change in a common data attribute being authenticated. Application A database 514 may include reference object 526 as previously explained. In one embodiment, the common data attribute of name 528 may be changed 580 from "Jim Bowen" 551 to "Ed Bowen" 552.

In one embodiment, application A 510 may access application A database 514 and store a queue record if changes to common data attributes have occurred. Application A 510, and the system including application A 510 (such as system A 106), may include native built-in workflow capabilities. In one embodiment, application A 510 may include a workflow manager 564 to manage these workflow capabilities. Spoke manager A 518 may monitor application A database 514 for a queue record. If a queue record is detected by spoke manager A 518, spoke manager A 518 may package a synchronization message that includes all of the common data attributes of the reference object 526 and sends the message to a hub manager. In a further embodiment, spoke manager A 518 may gather all the common data attributes of the reference object by making requests of application A 510 through an API or by accessing application A database 514 directly if there is no API available.

In one embodiment, a notification may be communicated to an authenticator 568 when a queue record is stored in application A database 514. The authenticator 568 may include a system administrator who may accept or reject the storage of the queue record. In another embodiment, the authenticator 568 may include computer software that automatically accepts or rejects the queue record according to certain parameters determined by the system administrator. For example, the system administrator may program the software to accept changes relating to the common data attribute of name 528 and reject changes the account number common data attribute 232. If the queue record is rejected, spoke manager A 518 does not build a message to send to a hub manager over network A 522.

Figure 11:
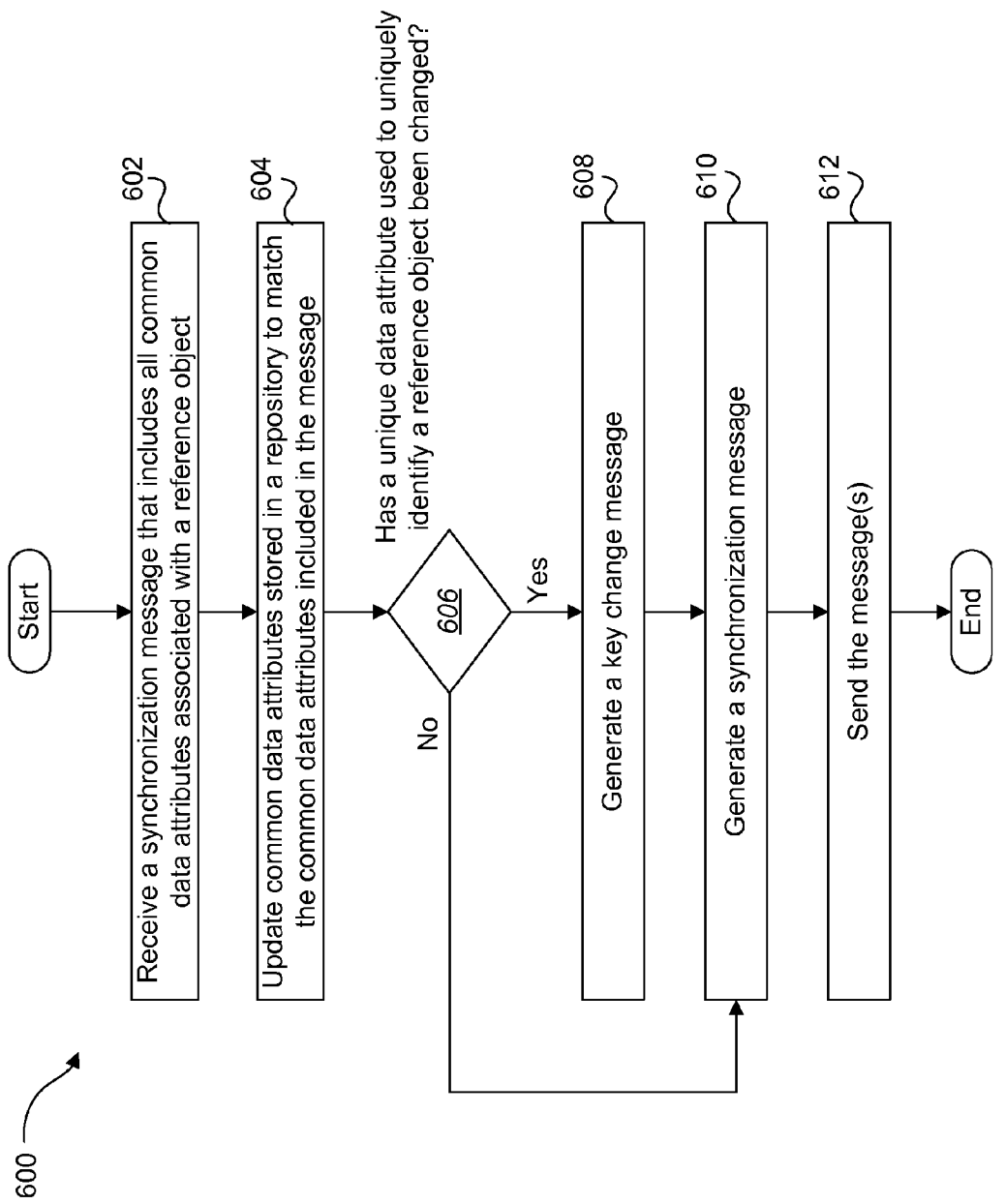
FIG. 11 is a flow diagram illustrating one embodiment of a method for notifying multiple systems and applications of changes to a common data attribute.

FIG. 11 is a flow diagram illustrating one embodiment of a method 600 for notifying multiple systems and applications of changes to common data attributes. In one embodiment, the method 600 may be implemented by the hub manager 102. A synchronization message that includes all common data attributes of a reference object may be received 602. In one embodiment, the data manager 456 receives 602 the message. Common data attributes that may be stored in a repository of the hub manager may be updated 604 to be in synchronization with the common data attributes included in the message. A determination 606 is made as to whether a unique data attribute used by a spoke manager to uniquely identify a reference object has been changed. If it is determined 606 that a unique data attribute is being updated, a key change message may be generated 608. In one embodiment, the key change message is queued up and addressed to the spoke manager(s) that use the unique data attribute to identify the reference object. If it is determined 606 that there is no unique data attribute being updated, a synchronization message may be generated 610. The synchronization message (and possibly the key change message) may be sent 612 to one or more spoke systems.

The message may include all the common data attributes associated with the reference object. The message may also include the unique data attribute used by the receiving spoke manager to uniquely identify the reference object. In one embodiment, the receiving spoke manager has sufficient contextual information to translate for differences in data structures, keys, application technologies and business rules. In a further embodiment, the receiving spoke manager may translate any differences and synchronize the data with its internal data structures.

Figure 12:
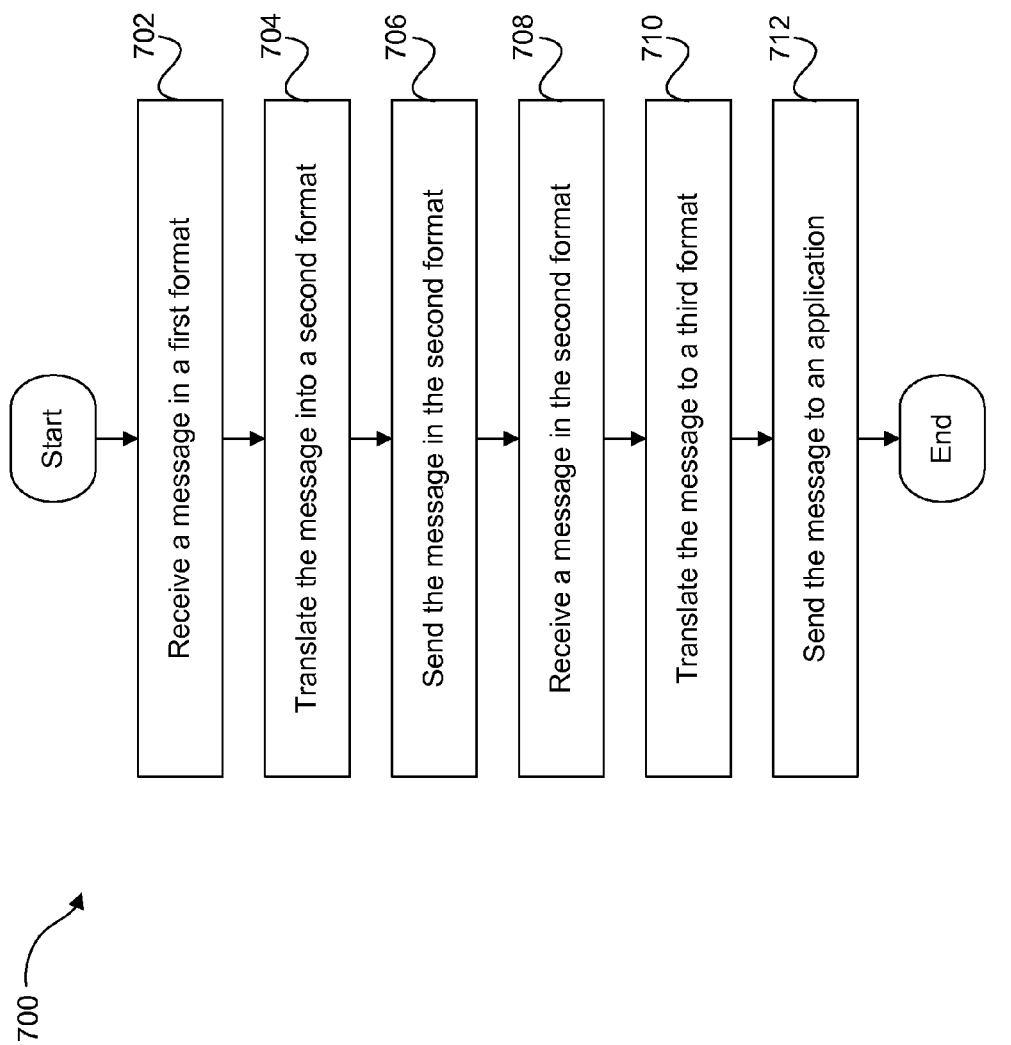
FIG. 12 is a flow diagram illustrating one embodiment of a method for translating a data packet into a specific data format.

FIG. 12 is a flow diagram illustrating one embodiment of a method 700 for translating a message into a specific format. In one embodiment, a spoke manager may implement the method 700. The message may be received 702 in a first format. In one embodiment, the first format may be a format specific to a particular system or application. The message may be translated 704 into a second format. In one embodiment, a translator included in the spoke manager may translate 704 the message into the second format. The message may be sent 706 in the second format. In one embodiment, the message may be sent to the hub manager 102 in the second format. The second format may include a format specific to the hub manager 102.

In one embodiment, a message may be received 708 in the second format. In one embodiment, the message may be received 708 from the hub manager 102. The message may be translated 710 to a third format. In one embodiment, the third format may be a format specific to a particular system and application. The message may be sent 712 to the system and application that is specific to the third format.

Figure 13:
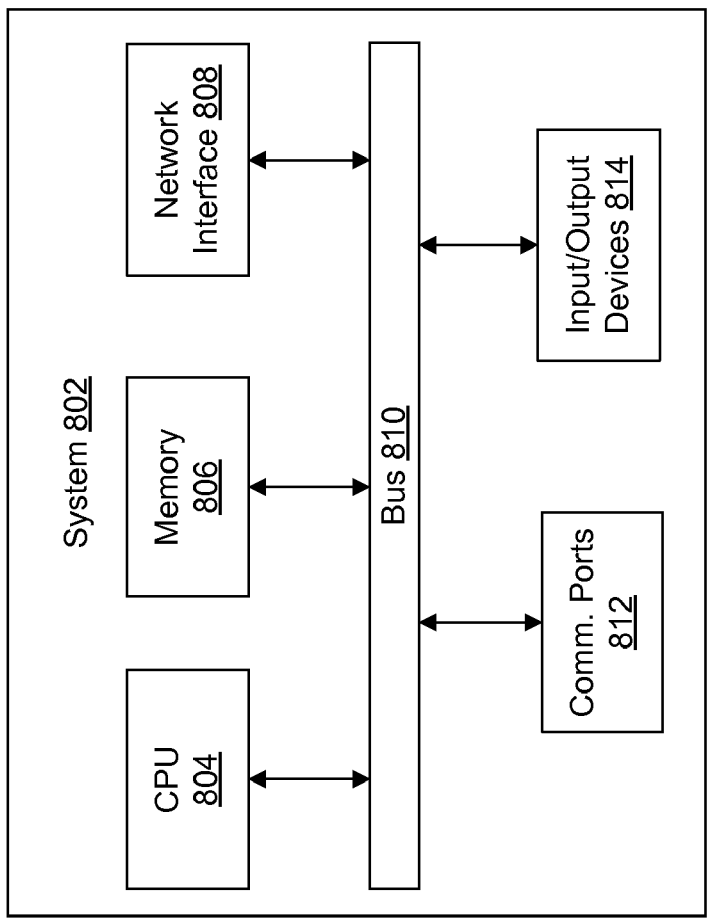
FIG. 13 is a block diagram of hardware components that may be used in an embedded device that is configured according to an embodiment.

FIG. 13 is a block diagram of hardware components that may be used in a system 802 that is configured according to an embodiment. A central processing unit (CPU) 804 or processor may be provided to control the operation of the system 802, including the other components thereof, which are coupled to the CPU 804 via a bus 810. The CPU 804 may be embodied as a microprocessor, microcontroller, digital signal processor or other device known in the art. The CPU 804 performs logical and arithmetic operations based on program code stored within the memory. In certain embodiments, the memory 806 may be on-board memory included with the CPU 804. For example, microcontrollers often include a certain amount of on-board memory.

The system 802 may also include a network interface 808. The network interface 808 facilitates communication between the system 802 and other devices connected to a network, which may be a pager network, a cellular network, a global communications network, the Internet, a computer network, a telephone network, etc. The network interface 808 operates according to standard protocols for the applicable network.

The system 802 may also include memory 806. The memory 806 may include random access memory (RAM) for storing temporary data. Alternatively, or in addition, the memory 806 may include read-only memory (ROM) for storing more permanent data, such as fixed code and configuration data. The memory 806 may also be embodied as a magnetic storage device, such as a hard disk drive. The memory 806 may be any type of electronic device capable of storing electronic information.

The system 802 may also include one or more communication ports 812, which facilitate communication with other devices. The system 802 may also include input/output devices 814, such as a keyboard, a mouse, a joystick, a touchscreen, a monitor, speakers, a printer, etc.

Of course, FIG. 13 illustrates only one possible configuration of a system 802. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A system for provisioning content to at least one user, the system comprising:
a content provisioning server comprising a processor, wherein the content provisioning server comprises:
a content provisioning application in communication with a user database, the content provisioning application containing computer executable code, which, when executed by the processor, causes the following to occur:
accessing the user database to identify a user;
determining rights of the user from the user database;
accessing a tree manager database to obtain a hierarchical tree user interface;
sending the hierarchical tree user interface to a client computing device that provides user interface items corresponding to the rights and associated links of the user, wherein the tree user interface is for a web browser on the client computing device, wherein tree manager code is sent that provides the tree user interface, wherein the tree user interface comprises a list of content that the user has rights to and associated links to access, wherein the tree user interface is stored in the "favorites" or "bookmarks" section of the web browser on the client computing device, and wherein the web browser communicates with a tree manager on the client computing device;
receiving user-initiated changes to the tree user interface from the client computing device;
sending a modified tree user interface to the content provisioning server as a hidden field in HTML form; and
writing the modified tree user interface, including the user-initiated changes, to the tree manager database, wherein all records of the original tree user interface in the tree manager database are replaced with the modified tree user interface, wherein the tree manager database also stores a sequential key that identifies the client computing device and one or more parent or child computers that are associated with the client computing device, wherein all of the child computers are represented by a range of sequential keys, wherein the sequential key of a parent computer determines the lower bound of the range and the upper bound of the range is stored with the parent computer.

2. The system of claim 1, wherein the content comprises files, applications and systems.

3. The system of claim 2, wherein the content further comprises services, links and web portals.

4. The system of claim 3, wherein the content further comprises mashup services.

5. The system of claim 1, further comprising a hub managing system that manages the user database.

6. The system of claim 1, wherein a plug-in is not required to modify the tree user interface and wherein each user can personalize the user's own tree user interface.

7. A method for provisioning content to at least one user, the method comprising:
receiving user information from a client computing device;
accessing a user database to identify a user using the user information;
determining rights of the user from the user database;
accessing a tree manager database to obtain a hierarchical tree user interface;
sending the hierarchical tree user interface to the client computing device that provides user interface items corresponding to the rights and associated links of the user, wherein the tree user interface is for a web browser on a client computing device, wherein tree manager code is sent that provides the tree user interface, wherein the tree user interface comprises a list of content that the user has rights to and associated links to access, wherein the tree user interface is stored in the "favorites" or "bookmarks" section of the web browser on the client computing device, and wherein the web browser communicates with a tree manager on the client computing device;
receiving user-initiated updates to the tree user interface from the client computing device;
building the tree user interface that was originally sent to the client computing device;
executing the user-initiated updates on the built tree user interface to obtain a modified tree user interface;
sending the modified tree user interface to a content provisioning server as a hidden field in HTML form; and
writing the modified tree user interface to the tree manager database, wherein all records of the original tree user interface in the tree manager database are replaced with the modified tree user interface, wherein the tree manager database also stores a sequential key that identifies the client computing device and one or more parent or child computers that are associated with the client computing device, wherein all of the child computers are represented by a range of sequential keys, wherein the sequential key of a parent computer determines the lower bound of the range and the upper bound of the range is stored with the parent computer.

8. The method of claim 7, wherein the content comprises files, applications and systems.

9. The method of claim 8, wherein the content further comprises services, links and web portals.

10. The method of claim 9, wherein the content further comprises mashup services.

11. A system for provisioning content to at least one user, the system comprising:

a content provisioning server comprising a processor, wherein the content provisioning server comprises:

a content provisioning application in communication with a user database, the content provisioning application containing computer executable code, which, when executed by the processor, causes the following to occur:

accessing the user database to identify a user;

determining rights of the user from the user database;

accessing a tree manager database to obtain a hierarchical tree user interface; and sending the hierarchical tree user interface to a client computing device that provides user interface items corresponding to the rights and associated links of the user, wherein the tree user interface is for a web browser on the client computing device, wherein tree manager code is sent that provides the tree user interface, wherein the tree user interface comprises a list of content that the user has rights to and associated links to access, wherein the tree user interface is stored in the "favorites" or "bookmarks" section of the web browser on the client computing device, wherein the web browser communicates with a tree manager on the client computing device;

the client computing device, wherein the client computing device comprises:

the web browser for displaying the tree user interface; and a queue structure for storing user-initiated changes to the tree user interface, wherein the user-initiated changes to the tree user interface create a modified tree user interface that is sent to the content provisioning server as a hidden field in HTML form, and wherein the modified tree user interface is written to the tree manager database, wherein all records of the original tree user interface in the tree manager database are replaced with the modified tree user interface, and wherein the tree manager database also stores a sequential key that identifies the client computing device and one or more parent or child computers that are associated with the client computing device, wherein all of the child computers are represented by a range of sequential keys, wherein the sequential key of a parent computer determines the lower bound of the range and the upper bound of the range is stored with the parent computer.

* * * * *